Aug. 6, 1968  C. J. BURCH  3,395,995
METHOD AND APPARATUS FOR GRANULATING SLAG
Filed Feb. 5, 1965  3 Sheets-Sheet 3
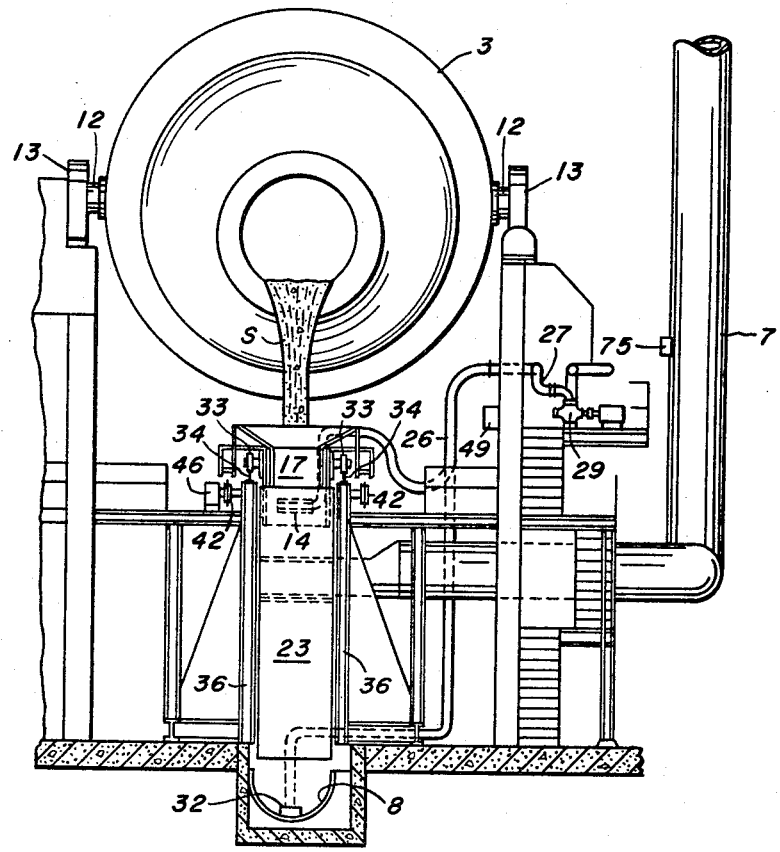
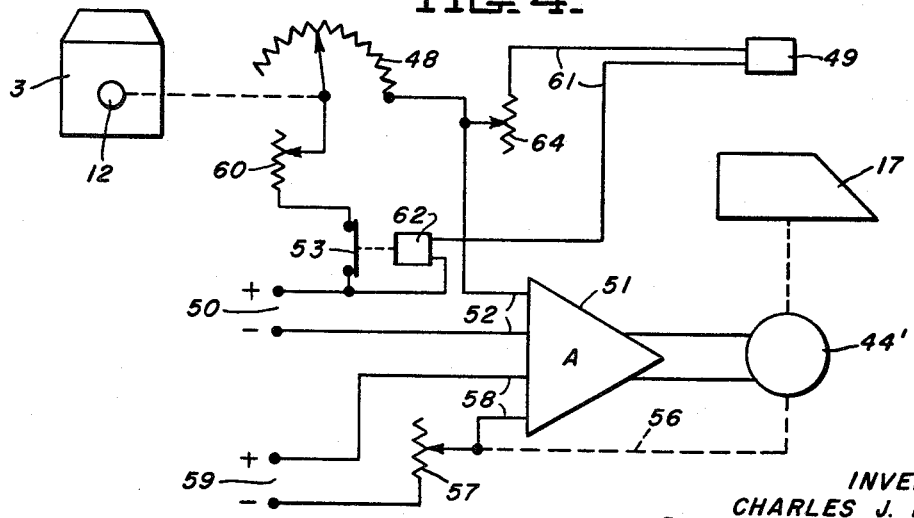
INVENTOR.
CHARLES J. BURCH
By Donald G. Dalton
Attorney United States Patent Office 3,395,995
Patented Aug. 6, 1968

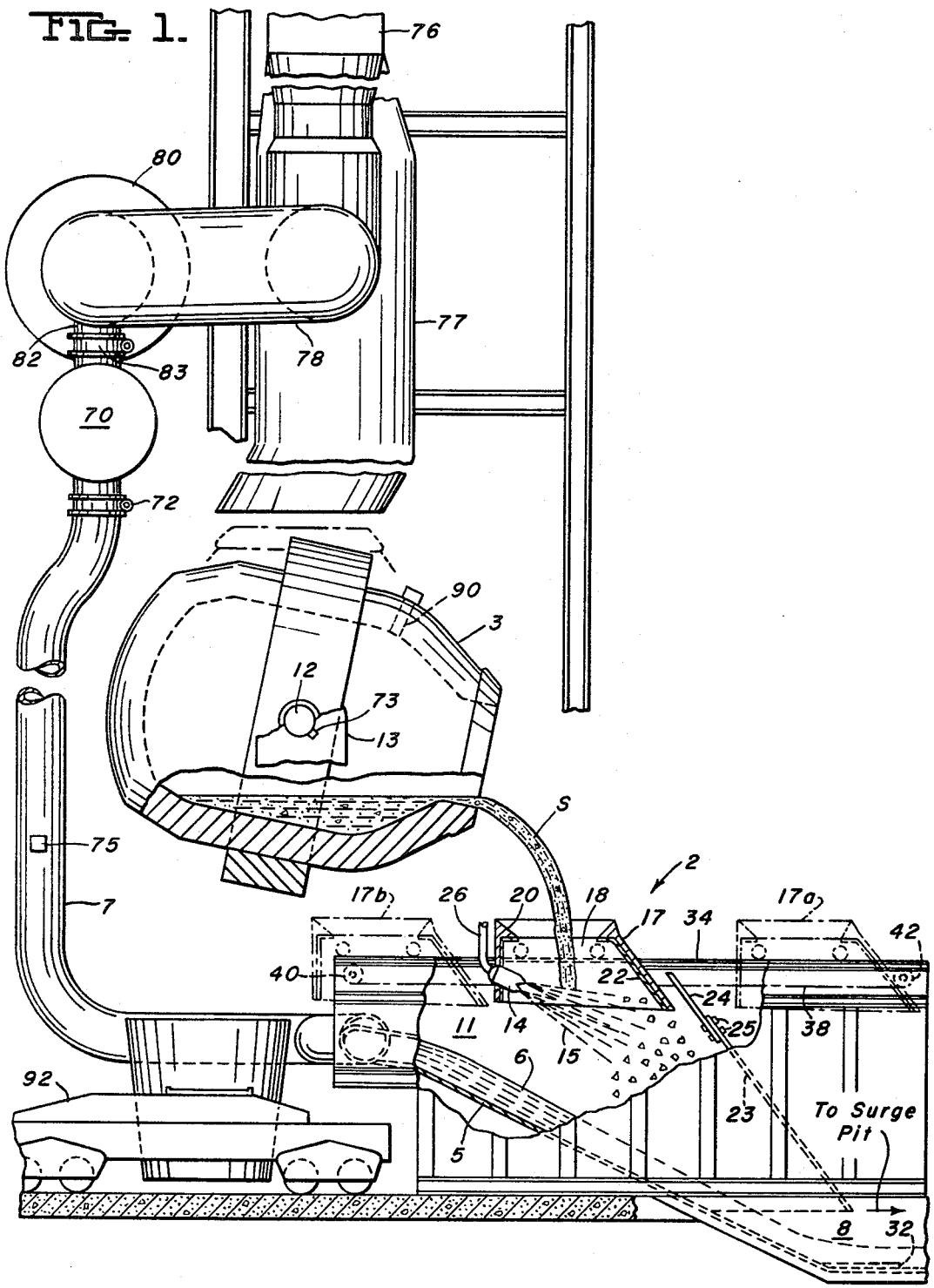

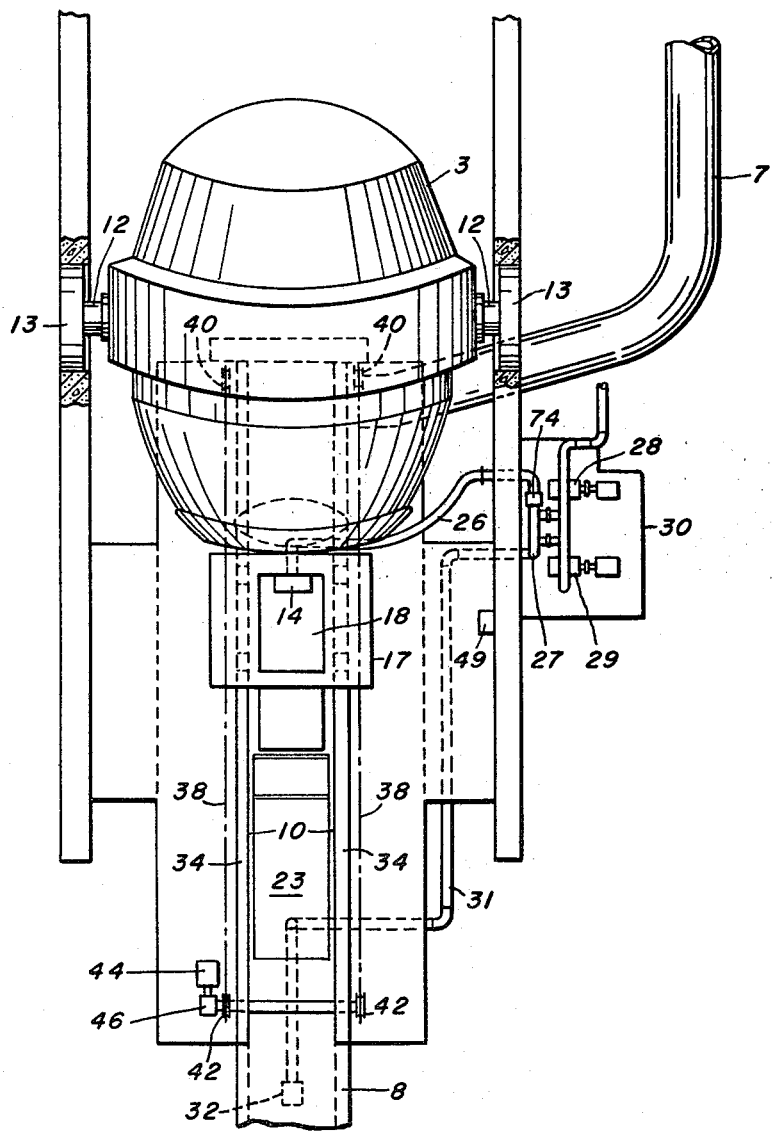

3,395,995
METHOD AND APPARATUS FOR
GRANULATING SLAG
Charles J. Burch, Lower Makefield Township, Bucks
County, Pa., assignor to United States Steel Corporation, a corporation of Delaware
Filed Feb. 5, 1965, Ser. No. 430,660
8 Claims. (Cl. 65—19)

ABSTRACT OF THE DISCLOSURE

A method and apparatus for removing slag from a steel refining vessel and transporting it to an appropriate disposal area. As the molten slag is poured from the vessel, a liquid spray is injected into the falling slag stream to break the slag into particles. Then the slag particles fall into a fast moving stream of liquid, which break the slag particles into smaller granules and carry the slag away. The liquid stream originates from an elevated storage tank, where the liquid is alternately accumulated during the refining of the iron, and released during the pouring of the slag.

---

This invention relates to a method and apparatus for removing slag from a steel refining vessel and transporting it to a distant dumping area. More particularly, the invention relates to the granulating of molten slag as it is poured from a tiltable vessel, and the removal of this slag from the vessel pouring area.

One of the big problems in the making of steel today is the removal and processing of the increased amounts of slag that accompany the large batches of steel produced by modern steelmaking methods. The slag disposal problem is particularly acute in the basic oxygen steelmaking process, where 150-ton vessels produce along with their steel output up to 40 tons of slag every 30 minutes. Prior known methods and means of slag removal have proven to be too slow and inefficient for handling such quantities of slag.

Usual procedures have involved the use of slag pots, which receive the slag as it is poured in its molten state from the refining vessel. These slag pots are often transported by rail to huge slag dumps or cylinder yards, where the molten slag is poured out and allowed to solidify. In other instances, the slag is dumped in its molten state at one end of the charging aisle, where it is allowed to solidfy. Then, it is broken up and loaded into a truck by means of a bucket loader, and hauled to an appropriate disposal area. Another method is one that has been currently proposed for removing the large amounts of slag produced by basic oxygen furnaces. This method also involves pouring molten slag from the refining vessel into a slag pot. The pot is then placed on a tilting rig where it is tipped to allow the slag to pour slowly into an inclined trough. As the molten slag slowly runs off the lower end of this trough, jets of water impinge slag to break it into granules. The granules fall into a tank of water, from where they are drawn off and transported by hydraulic means or by truck to an appropriate disposal area.

The main disadvantages of the foregoing methods reside in the use of the slag pots, in which the slag is stored for a period of time before it is to be dumped. When large amounts of slag are produced, a large number of slag pots are needed, each of which takes up valuable mill space and is expensive to maintain. Also, these processes are inherently slow, since the slag pots are either placed in line to await transportation by rail out of the mill, or are tilted very slowly to pour the slag into a trough to be granulated.

With my invention, the slag pots can be eliminated, and the slag can be granulated quickly as it is poured at a rapid rate from the refining vessel. In addition, the slag granules thus produced can be carried away to a distant disposal area by a continuous, high-speed process.

It is an object of my invention to provide a fast and efficient method of removing and transporting slag from a vessel, particularly the large amounts of slag produced by the high-capacity basic oxygen furnaces.

Another object of my invention is to provide apparatus for removing and transporting slag from a vessel that can handle rapidly the large amounts of slag produced by the high-capacity basic oxygen furnaces.

These and other objects will appear more readily from the following detailed description of my invention, and the attached drawings in which:

FIGURE 1 is a side elevation of apparatus for granulating and transporting slag from a steel refining vessel;

FIGURE 2 is a top plan view of the apparatus of FIGURE 1;

FIGURE 3 is an end elevation of the apparatus of FIGURE 1; and

FIGURE 4 is a diagram of an electric circuit for controlling a part of the apparatus of FIGURE 1.

In FIGURE 1, a slag granulator 2 is constructed beneath a steel refining vessel 3. At the bottom of the granulator 2 is an inclined plate 5 carrying a fast-moving stream of water 6 from water supply pipe 7 down to a sluice trench 8. The stream 6 is confined in the granulator by walls 10 (FIGURE 2), which with the inclined surface 5 form a bin 11 for receiving slag to be poured from the vessel 3.

Molten slag S is poured into the stream 6 by tilting the vessel 3 about its trunnions 12, which are pivotally held in supports 13. As the slag is poured from the vessel, it passes in front of nozzles 14, and onto the path of water jets 15 emanating from the nozzles 14. The jets 15 cool the slag and break it into large particles before the slag reaches the stream 6. The stream 6 further cools the slag particles, braks them into small granules, and carries them away through the sluice trench 8.

The nozzles 14 are mounted on a carriage 17 with their orifices pointing toward the falling slag S and slightly downward (FIGURE 1). The carriage 17 has a central opening 18, through which the slag S passes, and at the top of the opening 18 is provided a dish-shaped surface 20. In addition, the carriage 17 has an inclined surface 22 opposite the nozzles 14, designed to deflect downward the particles of slag which are shot horizontally by the force of the water jets 15. An inclined wall 23 is also provided in the bin 11 of the granulator to deflect the slag granules downward. At the top of the wall 23 is attached a deflector plate 24, that is secured with bolts 25. The plate 24 is removed when it is desired to move the nozzle carriage 17 to its dotted line position 17a (FIGURE 1) for repair or replacement.

A flexible hose 26 connects the nozzles 14 to a manifold 27 (FIGURES 2 and 3) leading to a main pump 28 and a standby pump 29, which are mounted on a nearby platform 30. The pumps 28 and 29 are also connected by a pipe 31 (FIGURES 2 and 3) to sluice jets 32 in the bottom of the trench 8. These jets aid in flushing the slag granules in stream 6 through the sluice trench 8. In installations where large amounts of slag must be handled, the pump 28 and the pump 29 should each be capable of supplying high-pressure water at a rate of 3600 gallons per minute, a rate sufficient to break up the slag stream and assist in sluicing away slag from vessel 3 at the rate of 40 tons per minute.

For optimum granulating conditions, the orifices of nozzles 14 should be maintained approximately 12 inches from the path of the molten slag S. However, they may be allowed to vary from 6 to 18 inches from the slag while obtaining satisfactory slag granulation. Since the stream of slag S falling from the vessel 2 shifts laterally as it is poured due to the increased tilting of the vessel, the nozzle carriage 17 is movable to maintain the nozzles 14 within their required range of distances from the slag.

Wheels 33, seen best in FIGURE 3, are mounted on the sides of the carriage 17, and roll on rails 34 mounted on top of rail support members 36, which extend above the top of granulator 2. Two endless chains 38 (FIGURE 2) are fastened to opposite sides of carriage 17, and these chains turn around idler sprockets 40 and drive sprockets 42 rotatably mounted beneath the rails 34 on opposite ends of the granulator 2. A motor 44 is connected mechanically to the drive sprockets 42 through a gear reducer 46. By turning the drive sprockets 42 and the endless chains 38 mounted thereon, the motor 44 moves the nozzle carriage 17 along rails 34. During the pouring of the slag S from the vessel 3, the carriage 17 is moved along rails 34 from its solid line position in FIGURE 1 to its dotted line position 17b. The carriage is moved past the removable deflector plate 24 to its position 17a only for the purpose of repairing or replacing it when the granulator is not operating.

As the slag is poured from the vessel 3, the nozzle carriage 17 may be moved to follow the slag stream by direction of a man at the control of the drive motor 44. However, to eliminate human error, various means may be provided for automatically moving the nozzle carriage 17 to maintain a specific distance from slag stream to nozzles and thus effect optimum granulating conditions.

A suitable system for this purpose is shown diagrammatically in FIGURE 4. The system utilizes a potentiometer 48 mounted on one of the vessel trunnions 12 to control the position of the nozzle carriage before and after the slag is poured, and a photoelectric transducer 49 mounted on a wall near the nozzle carriage 17 (FIGURES 2 and 3) to control the position of the carriage while the slag is being poured.

For the automatic control of the nozzle carriage before and after granulation of the slag, the potentiometer 48 has its slide connected mechanically to one of the trunnions 12 of the vessel 3. Current from a power source 50 is supplied to an amplifier 51 through lines 52, a normally closed switch 53, and the potentiometer 48. The amplifier responds by sending current to servomotor 44', which transmits power through mechanical means to move the nozzle carriage 17 in the desired direction. A feed-back linkage 56 is also connected to the motor 44', which operates a potentiometer 57 in an electrical feed-back circuit 58. Current is supplied to the circuit 58 at power source 59.

When the nozzle carriage 17 is in its proper position corresponding to the angle of tilt of the vessel 2, the voltage supplied by the feed-back circuit 58 to the amplifier 51 will be equal and opposite to the voltage across the lines 52. These voltages will cancel each other, and no current will flow to operate the servomotor 44'. When the vessel 2 is rotated, the slide on the potentiometer 48, connected to the trunnion 12, will move and a new voltage will be produced at the amplifier 51, unequal to the voltage supplied in the feed-back circuit 58. This will cause the amplifier 51 to send current to the servomotor 44', and the nozzle carriage will be moved in response to the tilting of the vessel. Meanwhile, the potentiometer 57 is continuously adjusted by the mechanical feed-back means 56, so that the voltage supplied to the amplifier 51 by the circuit 58 tends to cancel the voltage across lines 52 as the nozzle carriage 17 is brought closer to its proper position corresponding to the angle of tilt of the vessel 2.

A variable resistance 60 adjacent the potentiometer 48 permits adjustment of the position of the nozzle carriage in relation to tilt angle of vessel as desired.

For controlling the nozzle carriage 17 while the slag is flowing from the vessel 3, the transducer 49 is mounted on a wall near the carriage 17 (FIGURES 2 and 3). The transducer is connected to a circuit 61 (FIGURE 4) and maintains a normally open circuit until it senses infrared rays which emanate from the slag stream S.

When the slag begins to fall from the vessel and the transducer 49 is energized by the infrared rays from the slag, current flows through the circuit 61 and a relay coil 62, thereby opening switch 53 and disconnecting the potentiometer 48 from the amplifier 51. The transducer thus takes over control of the nozzle carriage while the slag is being poured. As the vessel 3 is tilted and the stream of slag S moves laterally from right to left, as viewed in FIGURE 1, the photoelectric cell of the transducer 49 follows the slag stream. This causes the transducer 49 to increase the voltage drop at the amplifier 51, thereby sending current to the servomotor 44', which drives the nozzle carriage. As the nozzle carriage moves toward its proper position in relation to the slag stream, the feed-back circuit 58 is adjusted to balance the voltage imposed by the transducer at amplifier 51, in the same manner as the feed-back operated with the potentiometer 48. Thus, the nozzle carriage 17 is moved horizontally with the slag stream S, and the nozzles 14 are maintained a desired distance from the slag. This distance between slag stream and the nozzles is preset by adjustment of a variable resistance 64 in the circuit 61.

When the flow of slag stops, the transducer 49 is de-energized and the circuit 61 is once again opened, thereby closing the switch 53 and restoring control of the nozzle carriage to the potentiometer 48.

Any photoelectric transducer may be used which will perform as described above, such as the one manufactured by ASEA of Vasteras, Sweden, model QGLF 102.

The stream of water 6 in the bottom of granulator 2 must move at a high volume rate of flow so that the large volume of hot slag particles falling from water jets 15 will be further cooled, granulated, and carried away at the same rate as they fall into the stream 6. For instance, if the slag S is to be granulated at the rate of 40 tons of slag per minute, the rate of flow of the stream 6 should be approximately 60,000 gallons per minute. To provide a flow of this magnitude, a large water storage tank 70 is mounted about 100 feet above the granulator 2. This tank is connected to the top end of pipe 7, which extends downward from the tank to the granulator 2. Immediately below the tank 70 in pipe 7 is a remote controlled valve 72. When this valve is opened, the water stored in the tank is released downward through the pipe 7 and into the bin 11 of granulator 2. It is recommended that the storage tank 70 have a capacity of 80,000 gallons and that the pipe 7 have a diameter of 48 inches, to provide a rate of flow of water through bin 11 of approximately 60,000 gallons per minute from the beginning to the end of the one minute granulation period.

The valve 72 and the water pump 28 are preferably controlled by a switch 73 (FIGURE 1) mounted on one of the trunnion supports 13. When the vessel 3 is tilted a given number of degrees toward its slag-pouring position, this switch starts either pump 28 or pump 29 supplying water to nozzle 14 and opens valve 72 to supply water to the bin 11 beneath the vessel. As safety features, a pressure switch 74 (FIGURE 2) is provided in manifold 27 leading from pumps 28 and 29, and another pressure switch 75 (FIGURES 1 and 3) is provided in water pipe 7. If for any reason water is not flowing from either pump 28 or pump 29, or there is no water flowing from tank 70, then either switch 74 or switch 75 will interrupt the motor control circuit for tilting the vessel 3 to prevent the vessel from reaching its slag-pouring position.

The tank 70 is filled between slag pourings at a much slower rate than the rate at which it is emptied. Any convenient source of water may be used for filling the tank, and the water need not be free of dust or other impurities since it is to be used only to cool hot slag and carry away slag granules. A recommended source of water in a basic oxygen furnace plant is the dust-laden effluent of the primary quencher which reduces the temperature of furnace waste gases and removes the gas-entrained heavy solids produced in the steel-refining process.

If primary quencher water is used, it can flow by gravity to the storage tank 70. The water supply system for the storage tank 70 is illustrated in FIGURE 1. A water spray quencher 76 is at the top of an exhaust stack 77 that is used for conducting away the gases produced in the refining of steel in vessel 3. During the partial cleaning of these gases in the quencher 76, the dust-laden water flows through duct 78 leading from the quencher 76 to a gas exhaust pipe 80. To trap this water, a pipe 82 with a valve 83 is connected between the duct 78 and water storage tank 70. When the valve 83 is open, all the water flowing from duct 78 flows through pipe 82 and into the storage tank 70.

In operation, the molten metal in vessel 3 is refined to its desired metallurgical composition with the vessel standing upright. When this is accomplished, the vessel is rotated counterclockwise, as viewed in FIGURE 1, to pour the metal through a tapping hole 90 in the side of the vessel (FIGURE 1) and into a steel ladle transfer car 92. The slag S remaining in the vessel 3 is then poured out by rotating the vessel in the opposite direction (clockwise) toward the position shown in FIGURE 1. Before the vessel reaches this position, either pump 28 or pump 29 supplying water to nozzles 14 is turned on, and valve 72 in pipe 7 is turned on to release the water which accumulated in the tank 70 during the refining process. Then, as the slag S is poured from the vessel, the high pressure water jets 15 from nozzles 14 break the molten slag into particles. The nozzle carriage 17 is moved on rails 34 as the slag is poured to maintain the nozzles approximately 12 inches from the slag stream. The slag particles produced by the jets 15 fall into the stream of water 6 that is released from the tank 70, where the slag is completely cooled and granulated. The mixture of granulated slag and water is conducted through the sluice trench 8 to a surge pit where it is accumulated to be pumped out to a metallics separation station or to a disposal area as desired. The entire amount of slag produced with each batch of steel is granulated and conducted to the surge pit in approximately one minute. The surge pit must be pumped out in approximately 30 minutes time to be emptied in preparation for the next slag flush. At the end of the slag flush, the nozzle water pump 28 or 29 is shut down. All of the water has been drained from the storage tank 70 and the remote-controlled valve 72 is automatically closed to permit refilling storage tank 70.

While I have illustrated and described one embodiment of my invention it will be apparent that other adaptations and modifications may be made without departing from the scope of the following claims.

I claim:

1. A method of disposing of the waste products of the refining of iron by a batch-type process comprising the steps of directing upward the waste gases produced during the refining of a batch of iron, then quenching and cleaning said gases with a spray of cooling liquid located above said iron being refined, accumulating adjacent to and above the location of said refining of iron enough dust-laden cooling liquid used in said quenching and cleaning of gases during said refining to carry away the slag produced in refining said batch of iron, then after said refining of the iron allowing said accumulated cooling liquid to flow downward and channelling the cooling liquid to form a fast-moving stream of cooling liquid beneath said location of iron refining, pouring into said stream of cooling liquid the slag produced during said refining, and injecting a jet of liquid into said molten slag as the slag falls toward said stream of cooling liquid, whereby said slag is broken into particles by said jet and then cooled, broken into small granules, and carried away by said stream of cooling liquid.

2. A method of disposing of the waste products of the refining of iron by a batch process comprising the steps of accumulating during the refining of a batch of iron at a place adjacent to and elevated above the location of said refining enough cooling liquid to carry away the slag produced in refining said batch of iron, then after said refining of the iron allowing said cooling liquid to form a fast-moving stream of cooling liquid beneath said location of iron refining, pouring into said stream of cooling liquid the slag produced during said refining, and injecting a jet of liquid into said molten slag as the slag falls from said vessel toward said stream of cooling liquid, whereby said slag is broken into particles by said jet and then cooled, broken into small granules, and carried away by said stream.

3. Apparatus for granulating molten slag pouring from a tilting vessel, comprising a nozzle mounted beneath said vessel with the orifice thereof oriented toward said slag pouring from said vessel, means for moving said nozzle horizontally to maintain said nozzle near the slag pouring from said vessel as said slag shifts laterally during the emptying of the vessel, means for injecting a liquid through said nozzle and into said molten slag so as to break said slag into particles, a storage tank for cooling liquid mounted above and adjacent to said slag-receiving bin, a pipe connecting said storage tank with said slag-receiving bin, and means for alternately accumulating cooling liquid in said storage tank and releasing the accumulated cooling liquid from said storage tank so as to flow downwardly through said pipe and then through said slag-receiving bin to carry away said slag particles.

4. Apparatus of claim 3 in combination with an oxygen steel refining vessel, a stack mounted above said vessel for receiving exhaust gases therefrom, a quencher connected to said stack having a dust-laden cooling liquid flowing therefrom, and means connected between said storage tank and said quencher for conveying said dust-laden cooling liquid to said tank.

5. Apparatus for granulating molten slag as it is poured from an oxygen steel refining vessel that is rotatably mounted about a pair of trunnions, comprising a carriage mounted beneath said vessel with a vertical opening therethrough for passage of said molten slag, a nozzle mounted on said carriage with the orifice thereof oriented toward said slag pouring from said vessel, means for moving said carriage and nozzle horizontally to maintain said nozzle near said pouring slag as the position of said slag shifts during the emptying of the vessel, means for injecting a liquid through said nozzle and into said slag so as to break said slag into particles, a slag-receiving means beneath said nozzle for receiving said slag particles, a stack mounted above said vessel for receiving exhaust gases therefrom, a liquid spray quencher connected to said stack, means mounted above said slag-receiving means for accumulating dust-laden liquid flowing from said quencher, a pipe connected between said accumulating means and said slag-receiving means, a valve in said pipe for allowing said dust-laden liquid to accumulate when closed and for releasing said liquid and allowing the liquid to flow downward to said slag-receiving means when open, and a sluice trench connected to said slag-receiving means for transporting said liquid and slag particles from underneath said vessel.

6. Apparatus for removing molten slag from a tiltable vessel, comprising trunnions mounted on said vessel, bearings holding said trunnions rotatably therein, means connected to one of said trunnions for tilting said vessel, a nozzle mounted beneath said vessel, means for injecting a jet of liquid through said nozzle and into said stream of slag so as to break said slag into particles, means for moving a stream of liquid underneath said vessel to carry away said slag, means limiting the angle of tilt of said vessel from its upright position when said liquid injection means is not operating, and means limiting the angle of tilt of said vessel from its upright position when said means for moving said liquid stream is not operating.

7. Apparatus for removing molten slag from a tiltable vessel, comprising trunnions mounted on said vessel, bearings holding said trunnions rotatably therein, means connected to one of said trunnions for tilting said vessel, a nozzle mounted beneath said vessel, means for injecting a jet of liquid through said nozzle and into said stream of slag so as to break said slag into particles, means for moving a stream of liquid underneath said vessel to carry away said slag, and means for operating said liquid injection means and said means for moving said liquid stream in response to the tilting of said vessel beyond a preset angle from its upright position.

8. Apparatus according to claim 7 including means limiting the angle of tilt of said vessel from its upright position when said liquid injection means is not operating, and means limiting the angle of tilt of said vessel from its upright position when said means for moving said liquid stream is not operating.

References Cited

UNITED STATES PATENTS

| | | | |
|---|---|---|---|
| 1,404,142 | 1/1922 | Riedel | 65—141 |
| 1,916,402 | 7/1933 | Allen | 65—141 |
| 2,386,294 | 10/1945 | Coss et al. | 65—160 |

DONALL H. SYLVESTER, *Primary Examiner.*

E. R. FREEDMAN, *Assistant Examiner.*

UNITED STATES PATENT OFFICE
CERTIFICATE OF CORRECTION

Patent No. 3,395,995                                              August 6, 1968

Charles J. Burch

It is certified that error appears in the above identified patent and that said Letters Patent are hereby corrected as shown below:

Column 1, line 44, "cylinder" should read -- cinder --. Column 2, line 28, after "from" insert -- a --; line 29, "confiined" should read -- confined --; line 36, "onto" should read -- into --.

Signed and sealed this 30th day of December 1969.

(SEAL)
Attest:

Edward M. Fletcher, Jr.                                  WILLIAM E. SCHUYLER, JR.
Attesting Officer                                                       Commissioner of Patents